(12) United States Patent
Gauthier, Jr.

(10) Patent No.: US 7,406,219 B2
(45) Date of Patent: Jul. 29, 2008

(54) LIGHT-SPEED HITPOINT SENSOR

(75) Inventor: Leo R. Gauthier, Jr., Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 266 days.

(21) Appl. No.: 11/410,660

(22) Filed: Apr. 25, 2006

(65) Prior Publication Data
US 2007/0112515 A1 May 17, 2007

Related U.S. Application Data

(60) Provisional application No. 60/674,483, filed on Apr. 25, 2005.

(51) Int. Cl.
G02B 6/00 (2006.01)
G01J 1/04 (2006.01)
G01J 1/42 (2006.01)
G01J 5/08 (2006.01)

(52) U.S. Cl. .................. 385/13; 385/12; 250/227.14; 250/227.16

(58) Field of Classification Search .................. 385/12, 385/13
See application file for complete search history.

(56) References Cited

U.S. PATENT DOCUMENTS

| | | | | |
|---|---|---|---|---|
| 4,781,056 A * | 11/1988 | Noel et al. | .................... | 73/800 |
| 4,836,030 A * | 6/1989 | Martin | .................... | 73/800 |
| 5,015,842 A * | 5/1991 | Fradenburgh et al. | .. | 250/227.15 |
| 5,072,110 A * | 12/1991 | Lu et al. | ................ | 250/227.14 |
| 6,559,437 B1 * | 5/2003 | Pope et al. | ............ | 250/227.14 |
| 7,189,959 B1 * | 3/2007 | Morison et al. | ........ | 250/227.14 |
| 2004/0206187 A1 * | 10/2004 | Williams | ..................... | 73/766 |
| 2004/0256543 A1 * | 12/2004 | Ishihara | ................ | 250/227.14 |
| 2006/0180380 A1 * | 8/2006 | Munch et al. | ............... | 180/274 |
| 2006/0278240 A1 * | 12/2006 | Spillman et al. | ........... | 128/898 |
| 2006/0291767 A1 * | 12/2006 | Andrews et al. | ............. | 385/13 |

FOREIGN PATENT DOCUMENTS

EP 0892244 A2 * 1/1999

\* cited by examiner

Primary Examiner—M. R. Connelly-Cushwa
(74) Attorney, Agent, or Firm—Aisha Ahmad

(57) ABSTRACT

The present invention is directed to a hitpoint sensor for a surface of interest, the hitpoint sensor having an optical fiber which is wound around or otherwise covering the surface, and a data processor connected to the ends of the optical fiber. When a collision with the surface occurs, light is generated which passes through the optical fiber. The ends of the fiber are connected to the data processor which uses arrival time information of the light signals arriving at the processor to determine the impact location on the surface. There are several modes in which the processor can operate to make this calculation.

15 Claims, 2 Drawing Sheets

LIGHT-SPEED HITPOINT SENSOR

CROSS-REFERENCE TO RELATED APPLICATIONS

This application claims the benefit of U.S. Provisional Application 60/674,483, filed Apr. 25, 2005, the entire contents of which are hereby incorporated by reference as if fully set forth herein, under 35 U.S.C. § 119(e).

STATEMENT OF GOVERNMENTAL INTEREST

This invention was made with Government support under Contract No. HQ0006-02-D-0003 awarded by the Missile Defense Agency. The Government has certain rights in the invention.

BACKGROUND OF THE INVENTION

1. Field of the Invention

The present invention relates to a hitpoint sensor which precisely measures the location of an energetic impact on a surface of interest. More specifically, it relates to a hitpoint sensor which precisely measures the location of energetic impact on a surface of interest, and which provides the measurement rapidly and efficiently.

2. Description of the Related Art

In many military and commercial applications it is usually necessary to measure the precise location of energetic impacts on a surface of interest.

One of the primary areas of application is in the field of missile defense where it is desired to destroy incoming enemy missiles. One approach to achieving this goal is with kinetic energy systems, which destroy enemy missiles by impacting them with kinetic energy from one or more projectiles. In the development and testing of these systems, it is necessary to be able to determine the precise location of the kinetic energy impact on the surface of the simulated enemy missile.

Other examples include the determination of the impact location of kinetic energy rounds targeting enemy ground assets for the purposes of weapon system development and testing or real-time battle damage assessment.

Existing hitpoint sensor systems either detect or estimate the location of kinetic energy collisions on surfaces. Conventional systems are generally of two types: electrical and optical. Electrical systems include the Coaxial Hit Grid (CHG) developed by Battelle Corporation. The CHG uses a grid of coaxial cable to estimate the impact location of a kinetic energy collision.

An example of an optical system is the Photonic Hit Indicator (PHI) developed by ITT. The PHI is a fiber-optic grid that is designed to provide unique impact location indications for different flight test targets. Another example of an optical system is the Blast Initiation Detector (BID) developed by Johns Hopkins University Applied Physics Laboratory (JHU APL). The BID detects the time of a collision by viewing the exterior of the surface. The BID is a high-speed instrument that detects rapid-onset optical events. It has a wide field-of-view and uses high-temperature optical fibers that maintain their field-of-view and optical throughput during the rapid heating that occurs during reentry into the earth's atmosphere. Another example of an optical system is the Planar Optical Penetration Sensors, also developed by JHU APL.

While these hitpoint sensor systems accomplish their intended purpose of detecting or locating energetic impacts on a surface of interest, they suffer from a number of drawbacks. Existing electrical systems often suffer from electromagnetic interference (EMI) that can corrupt the information and cause erroneous conclusions. Existing optical and electrical systems typically have high channel counts requiring high-speed sampling systems and associated complex data processing systems.

Related aspects of these designs include the needs for external power sources and data compression techniques. These requirements can present a number of drawbacks: First, external power sources can be awkward and unnecessarily burdensome, often limiting the utility of a system which is intended to be operated as an adjunct test device to a primary system undergoing test and evaluation procedures. Secondly, data compression techniques further complicate the design, and can present additional issues to the system. One issue may be time transmission of information associated with the impact location. In the case of a target system, there may be very little time to transmit the information before the system itself is destroyed; therefore, efficient encoding of the information associated with the impact location is very desirable.

In order to overcome these problems, what is needed is a simple to use hitpoint sensor, which does not require distributed electrical power and which uses low channel count and which is relatively immune to EMI, thus addressing and solving problems associated with conventional systems.

SUMMARY OF THE INVENTION

The present invention is directed to a hitpoint sensor for a surface of interest, the hitpoint sensor having an optical fiber which is wound around or otherwise covers the surface, and a data processor connected to the ends of the optical fiber. When a collision with the surface occurs, light is generated in the fiber which passes in two counter-propagating directions through the optical fiber. The ends of the fiber are connected to the data processor which uses arrival time information of the light signals arriving at the processor to determine the impact location on the surface. There are several modes in which the processor can operate to make this calculation.

It is an object of the invention disclosed herein to provide a new and improved hitpoint sensor, which provides novel utility and flexibility through the use of a unique design which uses a low channel count.

It is another object of the invention disclosed herein to provide a new and improved hitpoint sensor, which is relatively immune from EMI.

It is an advantage of the invention disclosed herein to provide a new and improved hitpoint sensor and fiber optic detection element, which is a passive sensor and therefore does not require external power sources.

It is another advantage of the invention disclosed herein to provide a new and improved hitpoint sensor, with substantially lower cost than existing systems, due in part to the low channel count.

It is a further advantage of the invention disclosed herein to provide a new and improved hitpoint sensor, which utilizes implicit data compression through encoding the hitpoint in a single number or a single sequence of numbers.

These and other objects and advantages of the present invention will be fully apparent from the following description, when taken in connection with the annexed drawings.

BRIEF DESCRIPTION OF THE DRAWINGS

The teachings of the present invention can be readily understood by considering the following detailed description in conjunction with the accompanying drawings, in which.

DETAILED DESCRIPTION OF THE PREFERRED EMBODIMENTS

Figure 1:
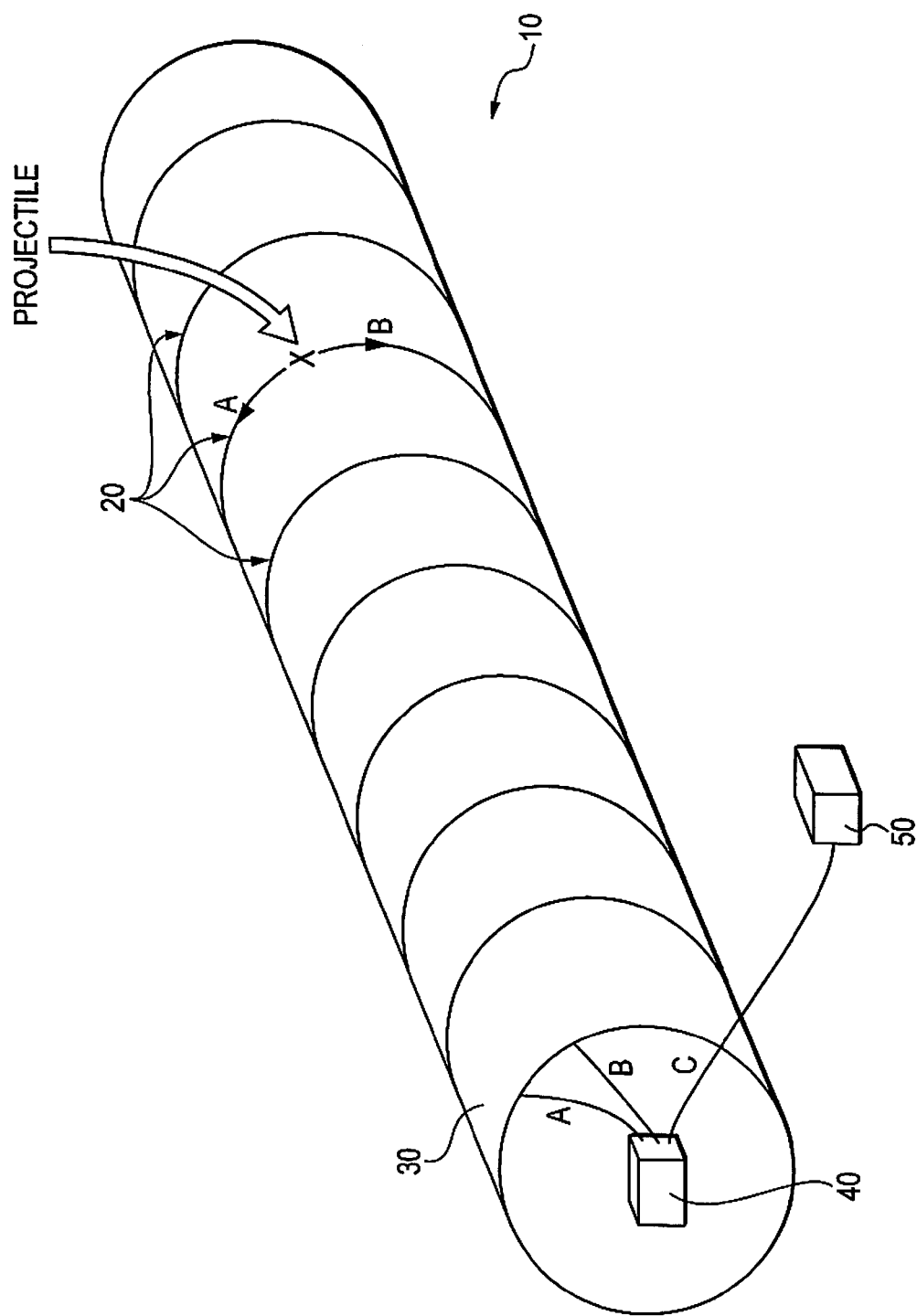
FIG. 1 is a side view of an example of a first embodiment of a hitpoint sensor according to the principles of the present application.

Referring now to the drawings in greater detail, FIG. 1 shows a side view of one embodiment according to the principles of the present application. Hitpoint sensor 10 includes optical fiber 20 which is wound around surface 30. The optical fiber 20 covers the surface 30 in such a fashion that a portion of the fiber is adjacent to or nearly adjacent to every point of interest on the surface. Thus every point or small region on the surface of interest has an associated point or small segment of the optical fiber sensor with which it is adjacent to. A projectile impact occurs at impact point X, which generates light within the fiber at location x. In a destructive scenario, the impact may break the fiber into two distinct sections A and B. In a non-destructive scenario, the impact or application of pressure may cause light to be generated within sections A and B of the fiber without actually breaking the fiber. For non-destructive applications, the fiber may need to be manufactured with embedded piezoluminescent materials that transform applied pressure into emitted light such as ZnS with Mn doping. The generated light travels through sections A and B of fiber 20 in the form of distinct light signal pulses, referenced herein as signals A and B. Sections A and B of fiber 20 are connected at their normally terminal ends to high-speed data processor 40 where their signals are input to two channels, referenced herein as channels A and B to indicate their source signals A and B.

It should be noted that although surface 30 is depicted in the drawings as having a generally cylindrical shape, the present application is not limited to this particular shape. Note that the principles of the present application may be applied to a wide variety of surfaces, and moreover to any surface 30 which admits optical fiber 20 being wound around it or otherwise covering or attached to the surface. Hence, the specific shape of surface 30 shown in FIG. 1 is shown for illustrative purposes and is not intended to limit the scope of this application.

The speed of light propagation through fiber 20 depends on the index of refraction of fiber 20. For materials of interest, the index of refraction typically varies between 1.4 and 1.8. Glass optical fibers are typically made from silica, but some other materials, such as fluorozirconate, fluoroaluminate, and chalcogenide glasses are used for longer-wavelength infrared applications. Like other glasses, these glasses have a refractive index of about 1.5. Plastic optical fiber (POF) is another option. However POF typically has much higher attenuation than glass fiber, 1 dB/m or higher, and this high attenuation limits the range of POF-based systems.

The frequency of the oscillator/counter used in high speed data processor 40 determines the spatial resolution of the system. In general, a 1 GHz counter is sufficient to resolve approximately 20 centimeters distance along fiber 20. If fiber 20 is wound such that successive revolutions are adjacent to each other, the 1 GHz counter can resolve the axial location of the impact point X to within less than 1 cm. A 10 GHz counter can resolve exact position to within approximately 2 centimeters along fiber 20, thus providing a high degree of both radial and axial impact location precision. A 16-bit counter running at 10 GHz counts up to 64K in 6.5 microseconds, during which time signal pulses A and B propagate through 1.3 km of wound fiber 20. Therefore, a single 16-bit count value provides the encoded impact position location X for over a kilometer of wound fiber 20, which easily covers most surfaces of interest.

The present application discloses two embodiments, which correspond to two modes of operation of the data processor.

In the first embodiment, illustrated in FIG. 1, data processor 40 operates in a time ratio mode. In time ratio mode, an adjunct device 50 is used to detect the time of impact. One example of such a device is the BID described above. This detection time signal is fed into a third channel C of data processor 40 which initiates the count value for each of the two data channels A and B corresponding to pieces A and B of fiber 20. The response time of the BID itself may have to be known and accounted for to produce the arrival time count values for channels A and B. In time ratio mode, the location of impact point X along fiber 20 is $L/(1+r)$, where r is the ratio of the arrival time count values for channels A and B compensated for BID response time, and L is the overall length of fiber 20. In time ratio mode the ratio does not depend on the speed of light in fiber 20. This can be an advantage as it eliminates the need for precise estimates of the index of refraction. The disadvantage of this technique is the required use of a third channel C to start the counter.

Figure 2:
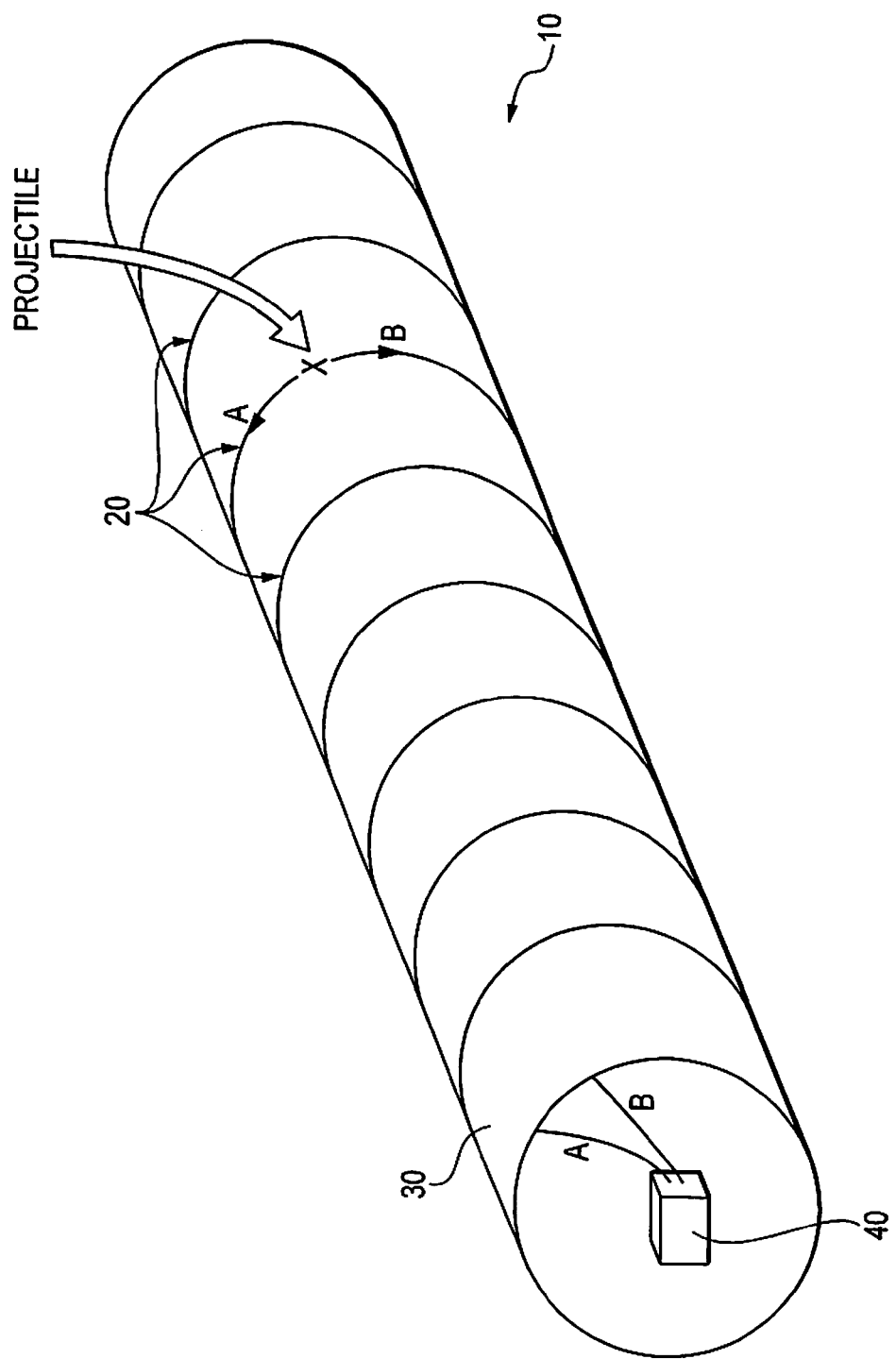
FIG. 2 is a side view of one example of a second embodiment of a hitpoint sensor according to the principles of the present application.

In a second embodiment, illustrated in FIG. 2, data processor 40 operates in a time difference mode. A high-speed counter is used which starts counting from the arrival of the first pulse, e.g. pulse A at data processor 40, until the arrival of second pulse B from the other end of fiber 40. Second pulse B stops the counter and provides a count value that is directly related to the location of impact point X. High-speed data processor 40 at the normal terminal ends of fiber 20 effectively acts as a stopwatch for the counter-propagating pulses A and B. In time difference mode, the speed of light through fiber 20 must be known a priori via calibration procedures. The advantage is that only two data channels are needed. In time difference mode, the location of impact point X along fiber 20 is $\frac{1}{2} \times [(\text{velocity} \times \text{time difference}) + L]$, where velocity is the speed of light in fiber 20 and L is the overall length of fiber 20.

In operation, when a high energy collision occurs with surface 30, and since surface 30 is covered with optical fiber 20, light is generated by the collision within the fiber 20 at the impact point X. In a destructive scenario, the fiber is broken and impact flash couples directly into the two open ends of the broken fiber 20 exactly where it was broken. In the non-destructive scenario, light is generated within the fiber core by embedded piezoluminescent materials such as ZnS with Mn doping at the impact point of optical fiber 20. In either case, a pair of light signal pulses A and B is produced which counter-propagate in opposing directions within fiber 20 towards the normal terminal ends of fiber 20 at data processor 40.

Data processor 40 then calculates the location of impact point X of the collision. Data processor 40 may operate in two modes, the time difference mode or the ratio mode.

In the time ratio mode, an adjunct device 50 is used to determine the time of impact. For example, a BID may be used as such a device. This device feeds into a third channel C which initiates the count value for each of data channels A and B. The initiation time must be compensated for the BID response time. The arrival of signal pulses A and B at each end stops the count value for each channel. The location of impact point X is $L/(1+r)$, where r is the ratio of the arrival time count values for the two wound fiber channels A and B and L is the overall length of fiber 20.

In the time difference mode, when the first pulse, e.g. pulse A, reaches data processor 40, a high-speed counter starts counting until the arrival of pulse B from the other end of fiber 20. Pulse B stops the counter and provides a count value that is directly related to impact location X. Data processor 40 at the normal terminal end of the fiber effectively acts as a stopwatch for the counter-propagating pulses A and B.

Thus, in each embodiment, the location of the impact point X is determined.

In a further variation, data processor 40 may be designed to correlate successive signal pulses. In this variation it is possible to resolve multiple impact events in fiber 20 in sequence.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. A device for estimating the location of an impact on a surface, the device comprising:
   an optical fiber, said fiber covering said surface, and said impact produces within said fiber a pair of signals;
   a data processor, said data processor receiving said pair of signals, and producing an impact location signal; and
   means for producing a time of impact signal, and wherein said data processor receives said time of impact signal, wherein said means for producing a time of impact signal is a Blast Initiation Detector;
   wherein said data processor calculates the ratio of the arrival times for said pair of signals.

2. The device of claim 1, wherein said data processor correlates successive signal edges to locate multiple impacts on said surface.

3. The device of claim 1, wherein said data processor receives said pair of signals and no other signal.

4. The device of claim 3, wherein said data processor calculates the time difference of arrival for said pair of signals.

5. The device of claim 4, wherein said data processor correlates successive signal edges to locate multiple impacts on said surface.

6. A method for determining the location of an impact on a surface, said method comprising:
   positioning optical fiber to cover said surface;
   producing, upon said impact, a pair of output signals within said fiber;
   receiving and processing said pair of output signals at a data processor, to calculate the location of the impact;
   producing a time of impact signal, and receiving and processing said time of impact signal; and
   calculating the ratio of the arrival times for said pair of signals.

7. The method of claim 6, further comprising:
   correlating successive signal edges to locate multiple impacts on said surface.

8. The method of claim 6, wherein said processing step is performed with said pair of signals and with no other signal.

9. The method of claim 8, further comprising:
   calculating the time difference of arrival for said pair of signals.

10. The method of claim 9, further comprising:
    correlating successive signal edges to locate multiple impacts on said surface.

11. A system for determining the location of an impact on a surface, said system comprising:
    means for producing a pair of signals within an optical fiber as a result of the impact;
    means for calculating, from said pair of signals, the location of the impact;
    means for producing a time of impact signal, and means for processing said time of impact signal; and
    means for determining the ratio of the arrival times for said pair of signals.

12. The system of claim 11, further comprising:
    means for correlating successive signal edges to locate multiple impacts on said surface.

13. The system of claim 11, wherein said means for calculating uses said pair of signals and no other signal.

14. The system of claim 13, further comprising:
    means for calculating the time difference of arrival for said pair of signals.

15. The system of claim 14, further comprising:
    means for correlating successive signal edges to locate multiple impacts on said surface.

* * * * *